US008277351B2

(12) United States Patent
Haughom

(10) Patent No.: US 8,277,351 B2
(45) Date of Patent: Oct. 2, 2012

(54) DEVICE FOR AN ELECTROMECHANICAL HOISTING MACHINE, ESPECIALLY FOR USE WHEN DRILLING OIL AND GAS WELLS

(75) Inventor: Per Olav Haughom, Tonstad (NO)

(73) Assignee: Seabed Rig AS (NO)

( * ) Notice: Subject to any disclaimer, the term of this patent is extended or adjusted under 35 U.S.C. 154(b) by 246 days.

(21) Appl. No.: 12/866,543

(22) PCT Filed: Feb. 10, 2009

(86) PCT No.: PCT/NO2009/000048
§ 371 (c)(1),
(2), (4) Date: Aug. 23, 2010

(87) PCT Pub. No.: WO2009/102215
PCT Pub. Date: Aug. 20, 2009

(65) Prior Publication Data

US 2010/0319999 A1 Dec. 23, 2010

(30) Foreign Application Priority Data

Feb. 13, 2008 (NO) .................................... 20080793

(51) Int. Cl.
*F16H 3/72* (2006.01)

(52) U.S. Cl. ............................................................ 475/6

(58) Field of Classification Search ................... 475/6, 9
See application file for complete search history.

(56) References Cited

U.S. PATENT DOCUMENTS 1,371,884 A 3/1921 Focks
1,519,309 A * 12/1924 Hummel ........................... 475/7
3,907,042 A 9/1975 Halwas et al.

FOREIGN PATENT DOCUMENTS

GB 2130682 A 6/1984
WO 87/07673 A1 12/1987
WO 02/079602 A1 10/2002
WO 2006/079759 A1 8/2006

* cited by examiner

*Primary Examiner* — Dirk Wright
(74) *Attorney, Agent, or Firm* — Akerman Senterfitt

(57) ABSTRACT

A device for an electromechanical hoisting machine (10) with driving gears (6) in engagement with rack rails (5) fixed to a steel structure (1). The hoisting machine is driven by electro-motors (8) which transmit torque to the driving gears (6) through the gearing (11), the shaft (15) and further the bevel gear drives (14, 16, 17) and gears (18, 19) to the driving gears (6) in engagement with rack rails (5). To achieve flexible load distribution on the driving gears (6), differential gears (12) supported on projecting shaft journals (20) connected to the main shaft (15) are arranged between the bevel gear drives (16).

2 Claims, 7 Drawing Sheets

DEVICE FOR AN ELECTROMECHANICAL HOISTING MACHINE, ESPECIALLY FOR USE WHEN DRILLING OIL AND GAS WELLS

This invention relates to an electromechanical hoisting machine which can be used for applying pressure and tensional forces to a drill string. More particularly, it relates to a hoisting device of the kind in which the hoisting forces are provided by the use of rack rails fixed to a steel structure and a movable hoisting machine with gears engaging the rack rails.

In connection with more advanced drilling operations for oil and gas it is often desirable, in addition to hoisting the drill string, also to be able to apply compressive forces to the drill string. In addition there is a need to be able to accurately determine the position of and loads applied to the drill string.

According to the prior art hoisting operations for drilling are carried out essentially with a wire and drawworks. In some cases also with hydraulic cylinders.

With a wire and drawworks it is not possible to apply compressive forces to the drill string and an accurate position is difficult to indicate because slack and stretching in the wire are difficult to estimate.

Hydraulic hoisting devices often give complicated solutions with comprehensive pumping and control systems for controlling speed and forces.

There are also solutions in which a form of chain links is used, which are provided with cogging that engages gears and moves the chain up and down along guides in a steel structure.

This solution involves complicated and expensive constructions of the chain which is subjected to wear in all its link connections.

The invention has for its object to remedy or reduce at least one of the drawbacks of known techniques.

GB 2130682 discloses a rack elevator, in which a motor drives, via a gearing and a driving gear, two intermediate gears which are both in engagement with the rack. The document does not describe any solution for the load distribution between the two intermediate gears.

The object is achieved in accordance with the invention through the features which are specified in the description that follows and in the claims that follow.

A hoisting machine is provided, in which the hoisting forces are provided by the engagement of a set of gears with rack rails fixed to a supporting structure of steel. The hoisting effect is provided by means of electromotors and gear transmissions.

The challenges of hoisting machines, in which several gears are driven by a common motor and in which the gears engage rack rails, are the load distribution between the gears. In rigid gear connections unpredicted bias loads may always occur, giving overload and damage on the gears.

Surprisingly, it has been found that a solution with a gear differential is well suited for load distribution between gears which engage rack rails.

A differential, see the detailed explanation of operation in the particular part of the description, is formed in such a way that it distributes a torque from an input shaft equally onto two output shafts which can rotate relative to each other.

In what follows is described an example of a preferred embodiment which is visualized in the accompanying drawings, in which.

Figure 1:
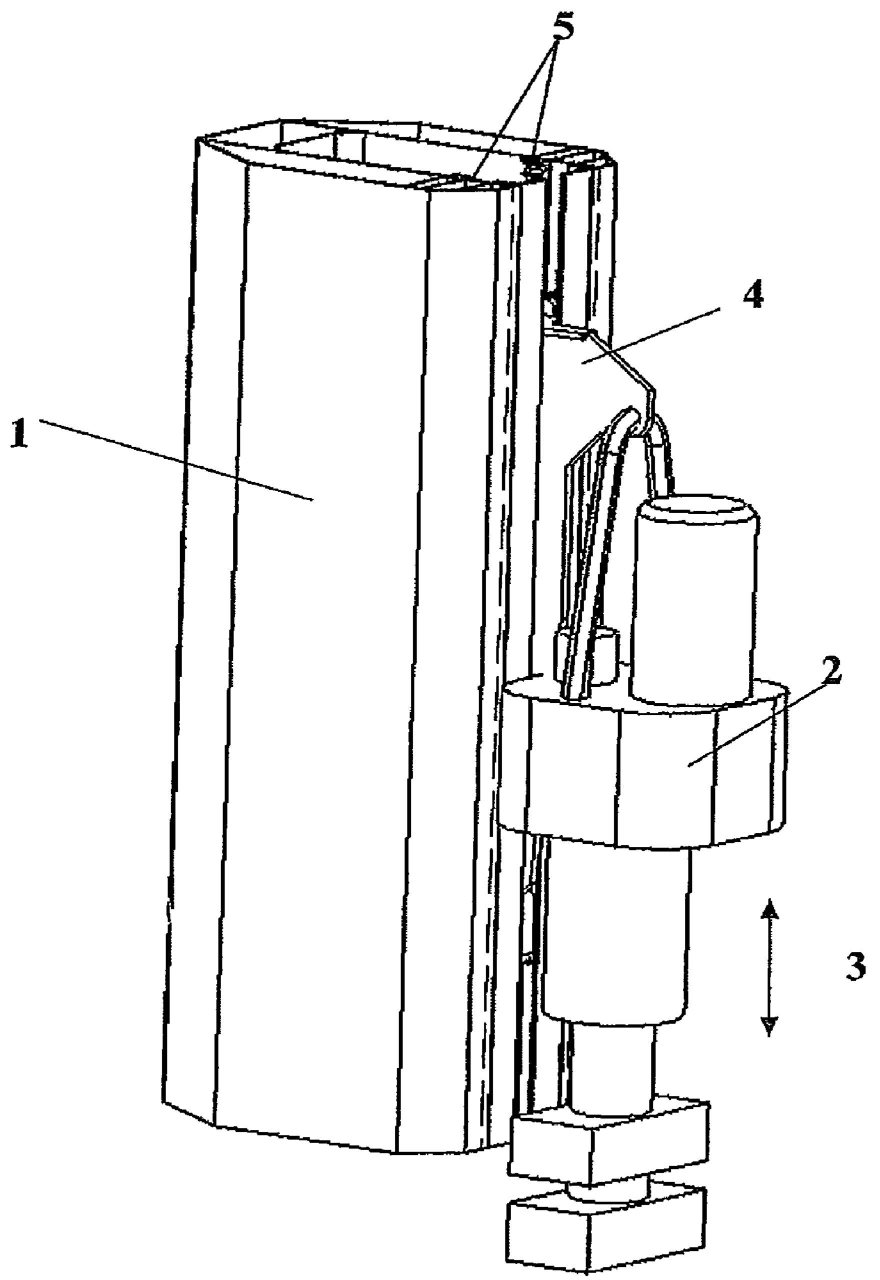
FIG. 1 shows a derrick structure for a hoisting machine with an associated drilling machine.
Figure 2:
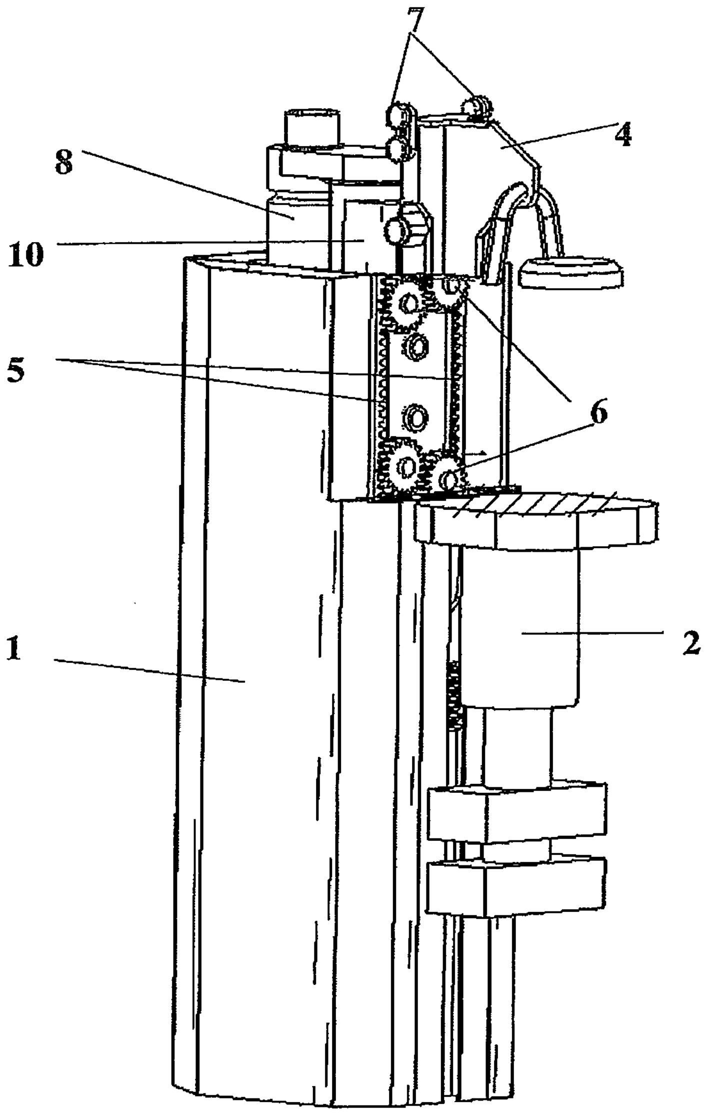
FIG. 2 shows, partially in section, the hoisting machine with gears engaging rack rails.
Figure 3:
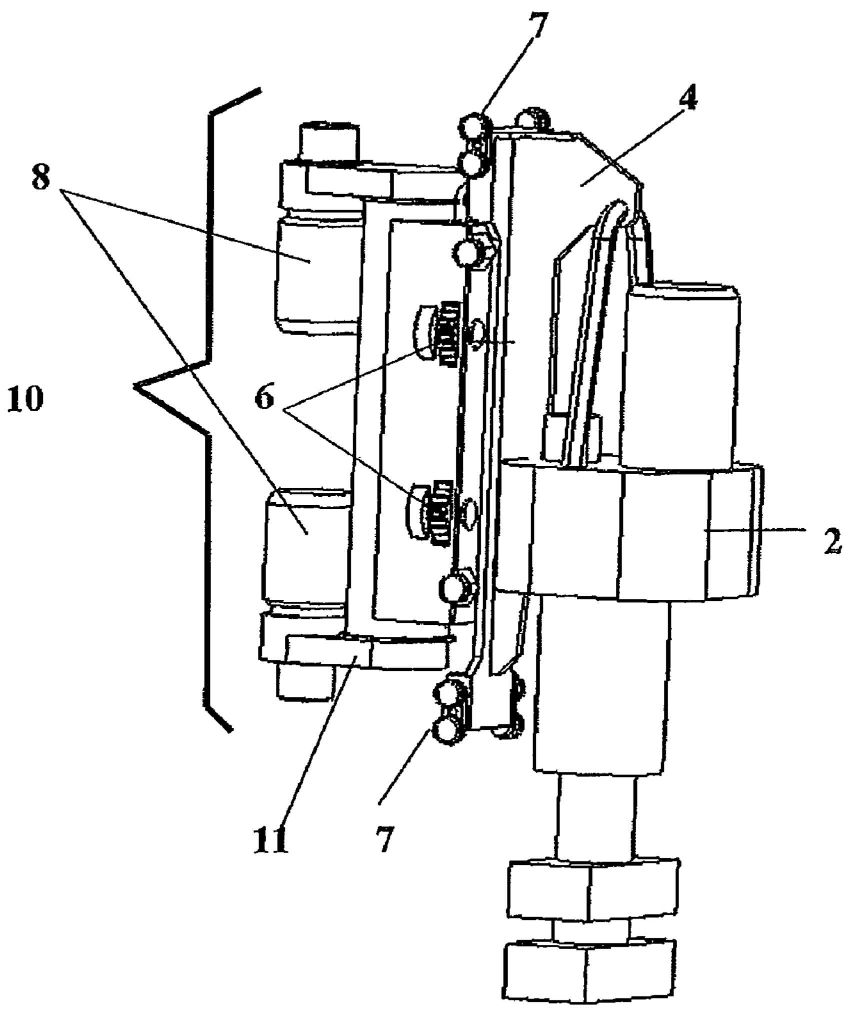
FIG. 3 shows the hoisting machine with a mounting yoke and drilling machine.
Figure 4:
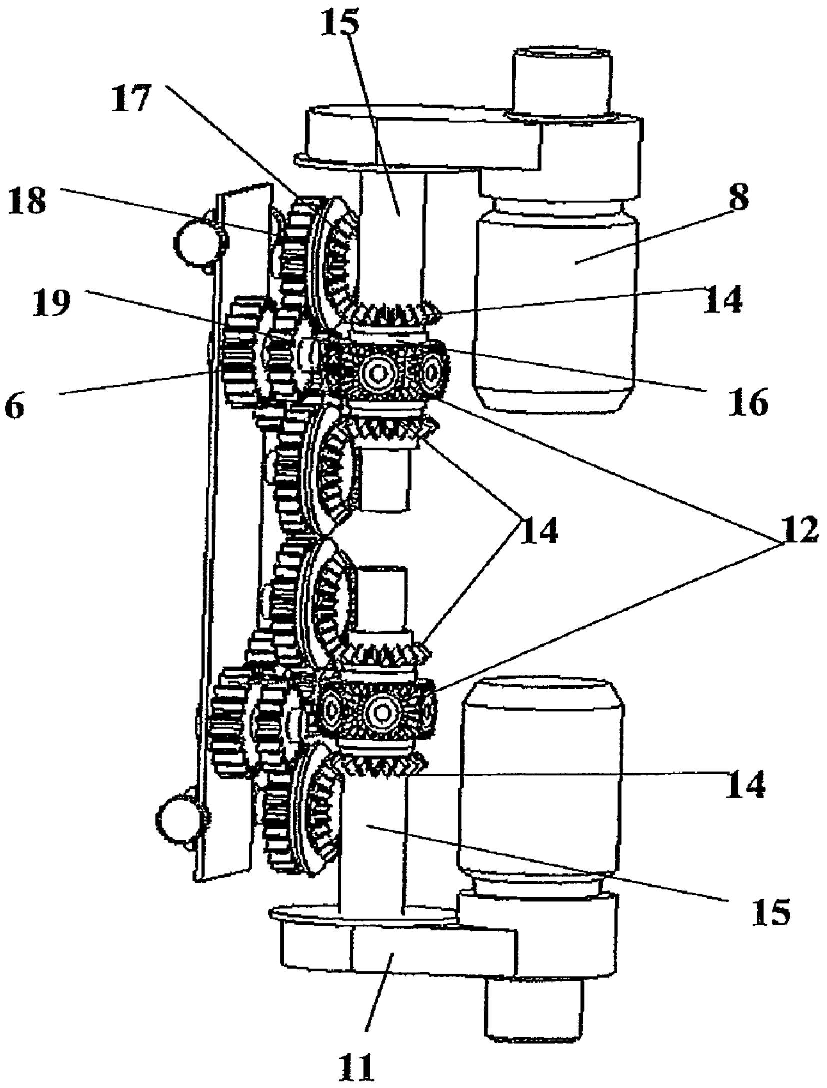
FIG. 4 shows differentials and gear transmissions in the hoisting machine.
Figure 5:
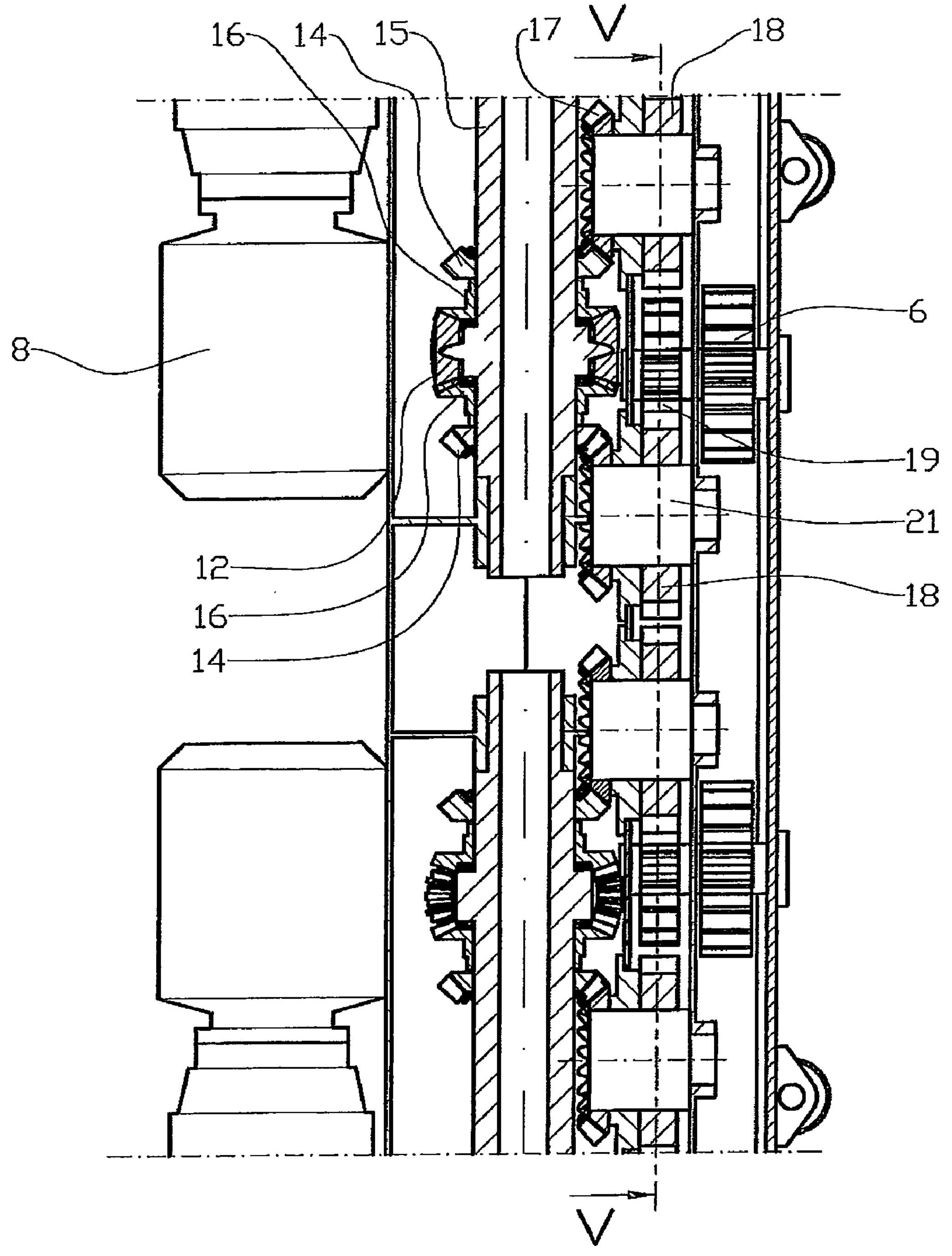
FIG. 5 shows a vertical section through the differentials and drive shafts.
Figure 5A:
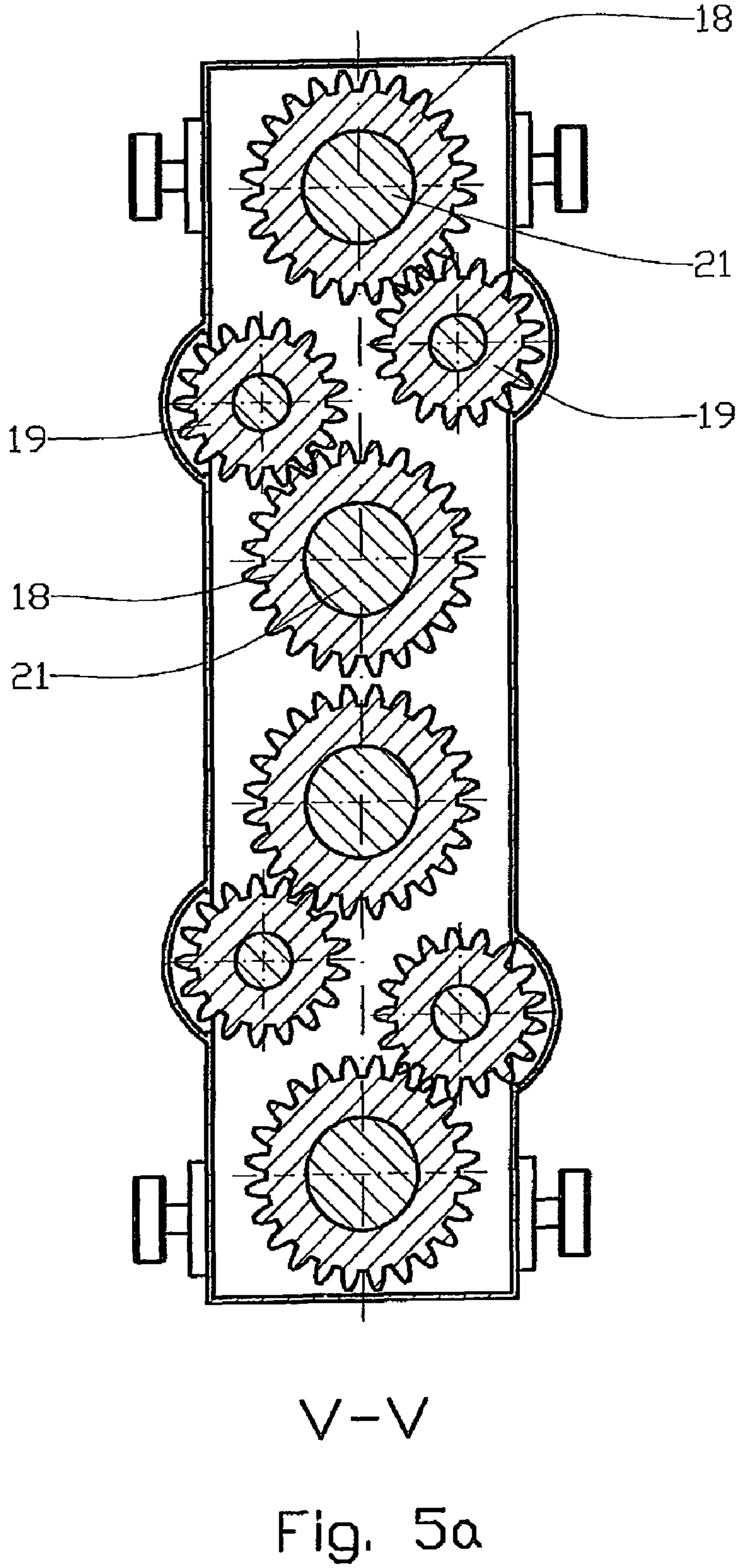

FIG. 5*a* shows a section V-V of FIG. 5; and

Figure 6:
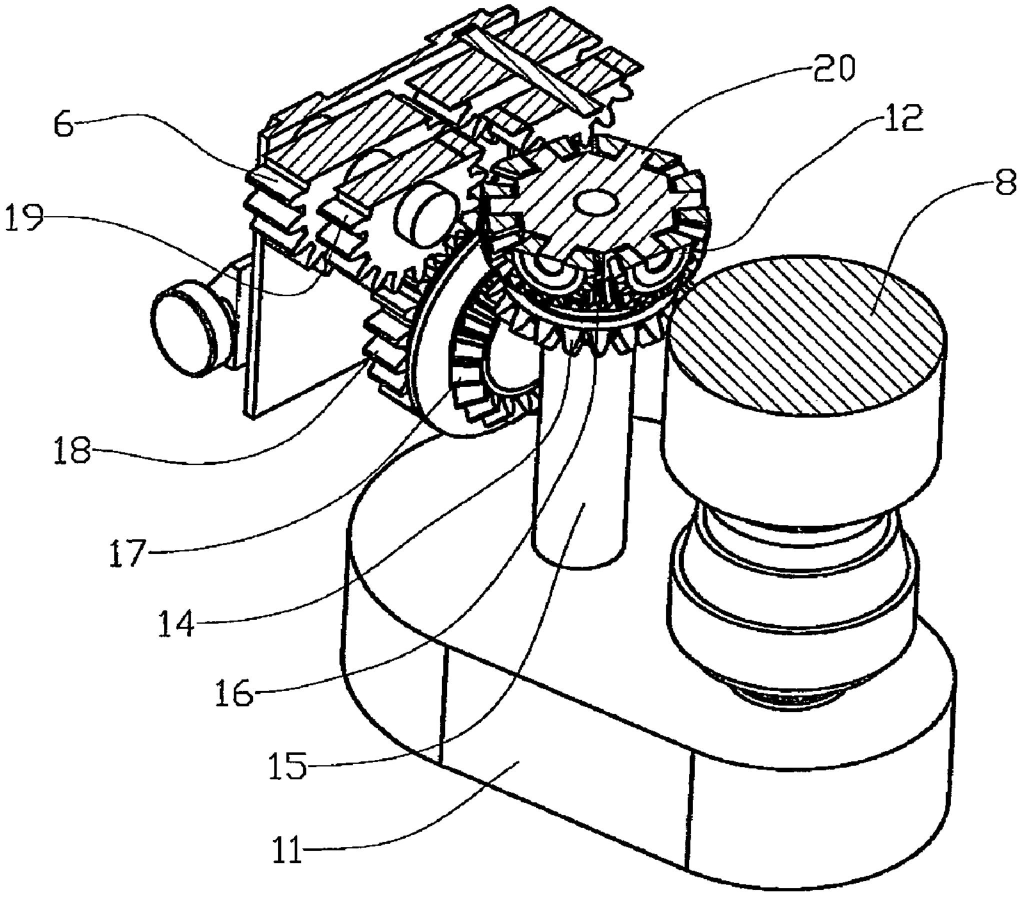

FIG. 6 shows a horizontal section through a differential.

In the drawings the reference numeral 1 indicates a supporting structure of steel, to which there are fixed two vertical rack rails 5 which are in engagement with four driving gears 6 of a hoisting machine 10. A drilling machine 2 is attached to the hoisting machine 10 through a supporting yoke 4.

The hoisting machine 10 performs vertical movements 3 and is held in position by means of rollers 7 running in slot guides in the supporting structure 1.

Power supply to the hoisting machine 10 is provided from two or more electromotors 8 arranged with gear transmissions 11 transmitting torque to main shafts 15 and further out through respective differentials and gears to the driving gears 6 which are in engagement with the rack rails 5.

The main shaft 15 is connected to differential gears 12 through support on shaft journals 20. Bevel gear drives 14 and 16 are connected to each other in a torsionally rigid manner and supported around the main shaft 15.

A bevel gear drive 17, which is in engagement with the bevel gear drive 14, is connected in a torsionally rigid manner to a gear 18 via an axle 21. The gear 18 is in engagement with and transmits torque to a gear 19 which, in turn, is connected in a rotationally rigid manner to the driving gear 6 which is in engagement with the rack rail 5, see FIGS. 5 and 5*a*.

Correspondingly, one opposite bevel gear drive 14 is connected to one corresponding driving gear 6 which is in engagement with an opposite rack 5.

With the solution described, the torque from the electromotor 8 is distributed equally between two of the driving gears 6 even if these have somewhat different rotation relative to each other. This is achieved by the differential gears 12, which are supported around the shaft journals 20, transmitting the torque from the main shaft 15 to the bevel gear drives 16 in such a way that the bevel gear drives 16 can rotate relative to each other and thereby distribute the torque equally onto the driving gears 6 which are in engagement with the rack rails 5.

Thereby, the intended function of equal distribution of the torque onto driving gears 6 connected in pairs is achieved.

The invention claimed is:

1. A hoisting machine for the vertical movement of a drilling machine which is connected to the hoisting machine, the hoisting machine comprising:

electromotors which are connected in a rotationally rigid manner to driving gears through a gearing, a shaft, bevel gear drives, gears, and a number of shaft journals arranged on the shaft and projecting radially therefrom, fitted with rotatable, supported differential gears which are in engagement with two of said bevel gear drives, the bevel gear drives each being connected in a rotationally rigid manner to a respective driving gear.

2. The hoisting machine in accordance with claim 1, wherein at least two of the driving gears of the hoisting machine engage respective rack rails which are fixed to a supporting structure, the rack rails having their toothings facing each other.

* * * * *